United States Patent Office 3,244,797
Patented Apr. 5, 1966

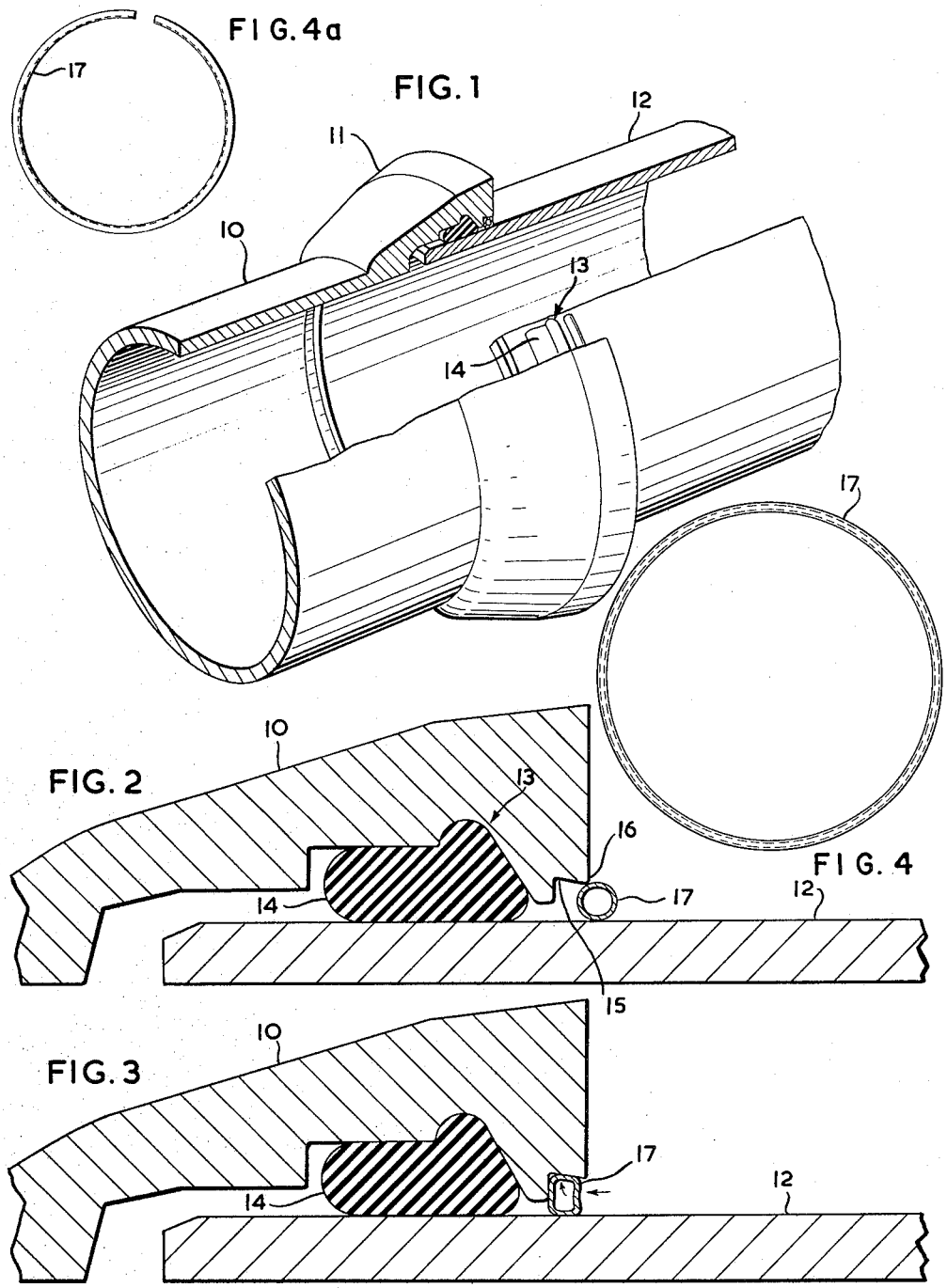

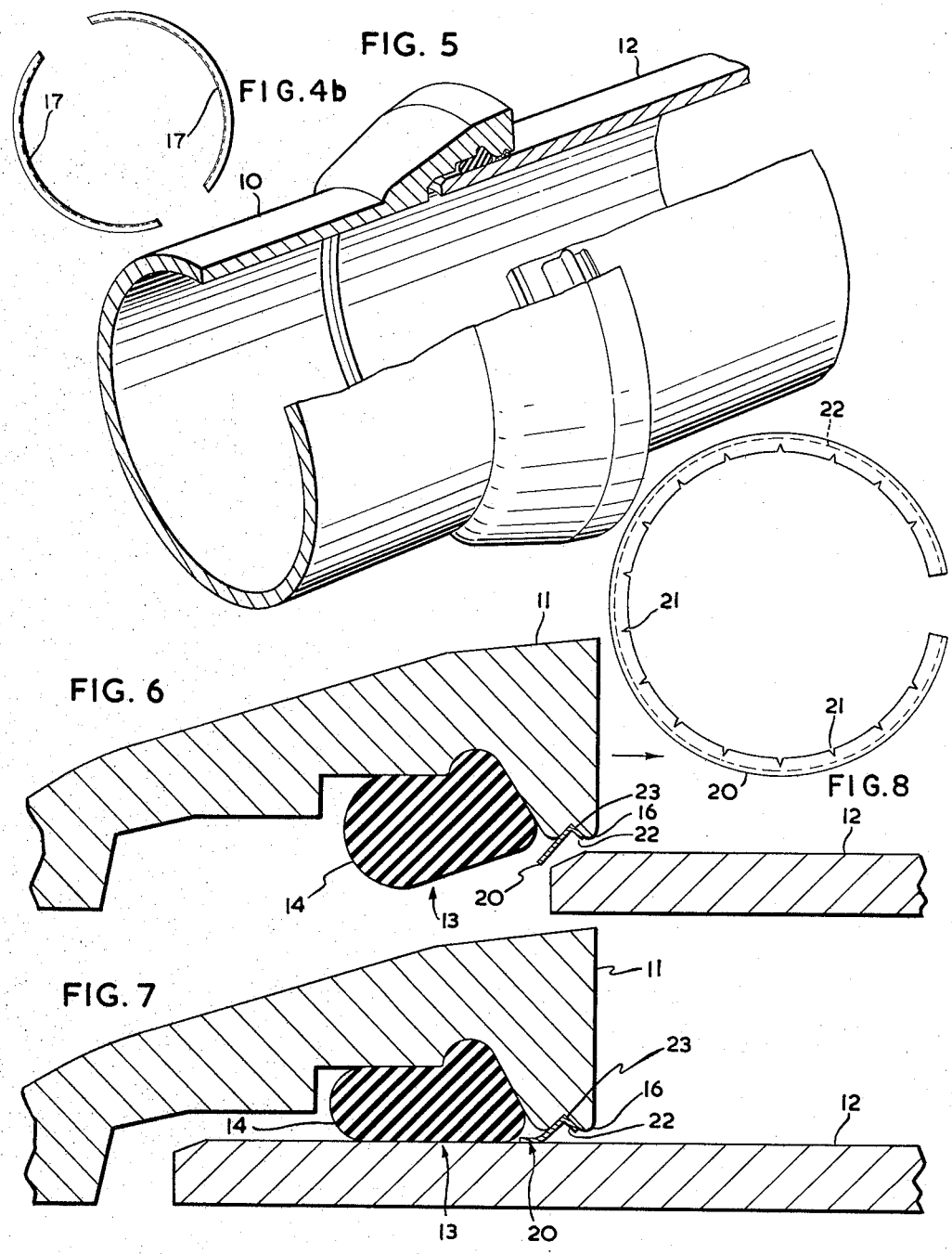

3,244,797
PIPE JOINT STRUCTURE INCORPORATING
ELECTRICAL CONDUCTIVITY MEANS
Cedric H. Watson, 5 Nancy Drive, St. Catharines,
Ontario, Canada
Filed Apr. 18, 1962, Ser. No. 188,332
Claims priority, application Canada, Apr. 22, 1961,
821,840
5 Claims. (Cl. 174—84)

This invention relates to pipe joints and, in particular, to a pipe joint for connecting metallic pipe and incorporating means to effect electrical conductivity between the joined pipe sections.

The pipe joint in accord with this invention is related to that type of joint referred to as a push-on or slip joint. This type of joint is commonly used for connecting water pipes and is characterized in that the two pipe ends are telescoped. The joint is sealed with a gasket made of rubber or other resilient sealing material and is incapable of conducting electricity. In climates where freezing conditions are encountered, this draw back is of serious consequence since it is not infrequent that a section of pipe line or a service line may freeze whereby it is necessary to thaw the frozen member so as to return it to operation. The normal method of effecting the thawing action is to pass electricity through the frozen member whereby it is heated by electrical resistance. In the case of a frozen service line, the larger mains are used to conduct the current to the service line concerned. In the less frequent event that a section of the mains themselves is frozen, it, too, can be thawed by resistance heating although a higher current is required. In any case, it is essential that there be a closed electrical circuit within the pipe line. Accordingly when the pipe line is connected by joints having an electrical insulator as the sealing means, an auxiliary device is required at each pipe joint to complete the electrical circuit within the pipe line. Such devices used to date have usually been of the metal wedge or insert type and for various reasons have been unsatisfactory. In particular, the prior devices have been found to fail to provide conductivity between the pipe sections because of looseness or loss of conductors through absence of a means of securing them in place.

It is, therefore, the object of this invention to provide a pipe joint incorporating a device for completing an electrical circuit between the connected pipe sections, which device is easily installed, somewhat flexible as to give under flexing stresses exerted on the pipe joint, and which will not loosen as to get out of place or fall off.

The object of the invention is accomplished by forming an annular shoulder about the inside wall of the outer pipe section and forcing an annular conductor of copper or the like behind the shoulder whereby to prevent the withdrawal of the conductor after it has been installed.

In drawings which illustrate embodiments of the invention,

FIGURE 1 is a cut-away perspective view of a pipe joint in accord with this invention, FIGURE 2 is a longitudinal cross section of a pipe joint illustrated in FIGURE 1 before the conductor has been installed, FIGURE 3 is a view similar to FIGURE 2 but showing the conductor in place, FIGURE 4 is a plan view of the conductor incorporated in the pipe joint illustrated in FIGURES 1, 2 and 3, FIGURES 4a and 4b are plan views of alternative forms of the conductor shown in FIGURE 4, FIGURE 5 is a perspective cut-away view of a second embodiment of the pipe joint in accord with this invention, FIGURE 6 is a longitudinal cross sectional view of the pipe joint illustrated in FIGURE 5 prior to the joining of the two pipe sections, FIGURE 7 is a view similar to FIGURE 6 but showing the completed joint, and FIGURE 8 is a plan view of the conductor incorporated in the pipe joint illustrated in FIGURES 5, 6 and 7.

Referring now to FIGURE 1, the pipe joint illustrated is a slip joint wherein one pipe section 10 is adapted to receive the other pipe section 12. This type of joint is most often used for connecting water pipe. The pipe sections are made of cast iron which has sufficient electrical conductivity to enable one to thaw a frozen member of the pipe line or a service line by passing an electrical current through the line using the line as the conductor. When a section of the cast iron main line freezes, the current must be increased to a high value so that the electrical resistance of the mains generates sufficient heat to melt the frozen liquid inside the section concerned. When a smaller service line is frozen, the mains are used only to conduct current to the service line and may not necessarily be heated to any degree themselves. As a matter of fact, it is more common to freeze a service line than a section of the cast iron mains but, in any case, it is essential that there be a closed electrical circuit within the total system.

The type of pipe joint shown in the drawings is quite often sealed by means of a rubber gasket such as the one illustrated. This particular gasket 13 is provided with an annular shoulder about its outside surface which engages in the annular recess on the inside of the hub portion 11 of pipe section 10. Before hub 11 receives the other pipe section 12, the skirt portion 14 of gasket 13 protrudes radially inward so that the inner pipe section 12 forces the skirt portion 14 outwardly as it is inserted in hub 11 whereby a very tight seal between the two sections is effected. As is best seen in FIGURES 2 and 3, rubber gasket 13 spaces the inner pipe section 12 from the outer pipe section 10 so that they are not actually in contact. The rubber gasket 13 being an insulator will not conduct current between the two pipe sections so that it is impossible to thaw out a frozen section of pipe line in the manner suggested above nor is it possible to thaw a frozen services line by feeding current to it through the mains. Prior to this invention, it was the usual practice to drive a number of metal wedges between the pipe sections 10 and 12 but, as mentioned above, there are numerous disadvantages to this practice.

In accord with this invention, the inner surface of hub 11 is provided with an annular recess 15 having a greater depth towards the inner end of hub 11 whereby to provide an annular shoulder 16. Shoulder 16 thus prevents the withdrawal of conductor 17 when the latter has been forced into the recess 15 as is shown in FIGURE 3. The conductor 17 illustrated in FIGURE 4 is a length of copper tubing joined at its abutting ends so that it must be passed over the end of the inner pipe section 12 before the joint is assembled. Alternatively, conductor 17 could be a split ring as shown in FIG. 4a which could be spread apart and placed about section 12 after the joint is assembled. Whichever of these two methods is used, conductor 17 is held against the hub end of section 10 and forced into recess 15 with a packing instrument or any similar device so that it deforms as to fill recess 15 and is thus held against withdrawal by shoulder 16. As a third embodiment, conductor 17 may be formed of one or more arc-shaped, short lengths of tubing such as shown in FIG. 4b. It will be appreciated that conductor 17 need not be manufactured of copper tubing and that any type of deformable, electrical conducting material will serve the purpose. It will be noted that a considerable amount of flexing of the assembled pipe joint could be tolerated by conductor 17 before it is forced out of place. Actually, it is impossible to displace conductor 17 by the maximum amount of flexure that this type of pipe joint can accommodate. It has been found that conductor 17 provides more than enough electrical conductivity between the joined pipe sections.

Referring now to FIGURE 5, the second embodiment of the pipe joint in accord with this invention differs from the embodiment illustrated in FIGURES 1 to 4 only in the shape of the recess for receiving the conductor and in the shape of the conductor itself. Otherwise, the two illustrated embodiments employ the same basic principle of placing an annular conductor within an annular recess on the inside surface of the hub portion of the joint whereby the annular shoulder defined by the recess prevents withdrawal of the conductor.

As shown in FIGURE 8, the conductor 20 is a split ring which is preferably made of copper. Conductor 20 may be formed from flat strip material provided with a plurality of notches 21. A peripheral flange 22 is formed along one side edge of the flat strip of material before or after the latter is bent into its circular form. As is best seen in FIGURES 6 and 7, flange 22 is formed at right angles to the main body of conductor 20 but it will be appreciated that this angle could be changed should it be desired to form the V shaped notch 23 on the inside surface of hub 11 so that the walls of the notch meet at an angle other than 90°.

In contrast to the FIGURES 1 to 4 embodiment of the invention, the conductor 22 is set into place within notch 23 before the joint is assembled. A good electrical connection between the pipe sections 10 and 12 is effected when section 12 is slid into hub 11 because conductor 20 will resist being deformed and thus will grip section 12 very tightly, provided, of course, that the size and spacing of notches 21 and the thickness of the metal forming the conductor are properly selected.

What I claim as my invention is:

1. A pipe joint for connecting metallic pipe in which the two pipe ends to be joined are adapted to telescope together, including a first annular recess about the inside wall of the outer pipe end, sealing means received in said first recess, said sealing means being an electrical insulator and spacing the inner end from the outer; a second annular recess about the inside wall of the outer pipe end and spaced axially from said first recess, an annular shoulder adjacent said second recess, the radial distance from said inner pipe end to said shoulder being less than the radial distance from said inner pipe end to the deepest part of said second recess, and a one-piece conductor in the form of a circlet of tubing of electrical conductive and deformable metal which has been forced past said shoulder and deformed to substantially fill said second recess, said conductor contacting both said inner and outer pipe ends as to provide electrical conductance therebetween, said shoulder serving to restrain said conductor against movement longitudinally of the pipe ends whereby to restrain said conductor in said second recess.

2. A pipe joint for connecting metallic pipe in which the two pipe ends to be joined are adapted to telescope together, including a first annular recess about the inside wall of the outer pipe end, sealing means received in said first recess, said sealing means being an electrical insulator and spacing the inner pipe end from the outer; a second annular recess about the inside wall of the outer pipe end and spaced axially from said first recess, an annular shoulder adjacent said second recess, the radial distance from said inner pipe end to said shoulder being less than the radial distance from said inner pipe end to the deepest part of said second recess, and a one-piece conductor in the form of a split ring of electrical conductive and deformable metal which has been forced past said shoulder and deformed to substantially fill said second recess, said conductor contacting both said inner and outer pipe ends as to provide electrical conductance therebetween, said shoulder serving to restrain said conductor against movement longitudinally of the pipe ends whereby to retain said conductor in said second recess.

3. A pipe joint for connecting metallic pipe in which the two pipe ends to be joined are adapted to telescope together, including a first annular recess about the inside wall of the outer pipe end, sealing means received in said first recess, said sealing means being an electrical insulator and spacing the inner pipe end from the outer; a second annular recess about the inside wall of the outer pipe end and spaced axially from said first recess, an annular shoulder adjacent said second recess, the radial distance from said inner pipe end to said shoulder being less than the radial distance from said inner pipe end to the deepest part of said second recess, and a pair of conductors, each consisting of an arc-shaped length of copper tubing which have been forced past said shoulder and deformed to substantially fill the portions of said second recess wherein they are located, said conductors contacting both said inner and outer pipe ends as to provide electrical conductance therebetween, said shoulder serving to restrain said conductors against movement longitudinally of the pipe ends whereby to retain said conductors in said second recess.

4. A pipe joint for connecting metallic pipe in which the two pipe ends to be joined are adapted to telescope together, including a first annular recess about the inside wall of the outer pipe end, sealing means received in said first recess, said sealing means being an electrical insulator and spacing the inner pipe end from the outer; a second annular recess about the inside wall of the outer pipe end and spaced axially from said first recess, an annular shoulder against said second recess, the radial distance from said inner pipe end to said shoulder being less than the radial distance from said inner pipe end to the deepest part of said second recess, and an electrical conductor within said recess and contacting both said inner and outer pipe ends as to provide electrical conductance therebetween, said shoulder serving to restrain said conductor against movement longitudinally of the pipe ends whereby to retain said conductor in said second recess, said conductor being formed of flat strip material and V shaped in cross section, one of the arms of the V being longer than the other arm, said conductor being inserted within said second recess prior to the assembly of the pipe joint, the inner pipe end acting to deform said longer arm as said inner pipe end is telescoped with the other pipe end whereby to achieve good electrical connection between said conductor and said inner pipe end.

5. A pipe joint for connecting metallic pipe in which the two pipe ends to be joined are adapted to telescope together, including a first annular recess about the inside wall of the outer pipe end, a rubber gasket sealing ring received in said first recess, said rubber gasket sealing ring being an electrical insulator and spacing the inner pipe end from the outer; a second annular recess about the inside wall of the outer pipe end and spaced axially from said first recess, an annular shoulder adjacent said second recess, the radial distance from said inner pipe end to said shoulder being less than the radial distance from said inner pipe end to the deepest part of said second recess, and a pair of conductors each consisting of a length of copper tubing which are forced past said shoulder after said pipe joint is assembled as to be deformed to substantially fill the portions of said second recess wherein they are located, said conductors contacting both said inner and outer pipe ends as to provide electrical conductance therebetween, said shoulder serving to restrain said conductor against movement longitudinally of the pipe ends whereby to retain said conductors in said second recess.

References Cited by the Examiner

UNITED STATES PATENTS

| | | | |
|---|---|---|---|
| 2,230,725 | 2/1941 | Nathan | 285—340 X |
| 2,533,097 | 12/1950 | Dale. | |
| 2,991,092 | 7/1961 | MacKay | 174—84 X |
| 3,093,703 | 6/1963 | Zavertnik | 174—86 |

ROBERT K. SCHAEFER, *Primary Examiner.*

JOHN P. WILDMAN, DARRELL L. CLAY,
*Examiners.*